US007911376B2

(12) United States Patent
Hardacker et al.

(10) Patent No.: US 7,911,376 B2

(45) Date of Patent: Mar. 22, 2011

(54) SYSTEMS AND METHODS FOR ANTENNA ARRAY CALIBRATION

(75) Inventors: Robert Hardacker, Escondido, CA (US); Bob Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 127 days.

(21) Appl. No.: 12/416,860

(22) Filed: Apr. 1, 2009

(65) Prior Publication Data

US 2010/0253572 A1 Oct. 7, 2010

(51) Int. Cl.
*G01S 7/40* (2006.01)

(52) U.S. Cl. ........................................................ 342/174

(58) Field of Classification Search .................. 342/173, 342/174, 73, 74

See application file for complete search history.

(56) References Cited

U.S. PATENT DOCUMENTS

| | | | | |
|---|---|---|---|---|
| 3,646,558 | A | 2/1972 | Campanella | |
| 5,038,146 | A * | 8/1991 | Troychak et al. | 342/173 |
| 5,412,414 | A * | 5/1995 | Ast et al. | 342/174 |
| 5,469,172 | A * | 11/1995 | Schleder et al. | 342/174 |
| 5,530,449 | A * | 6/1996 | Wachs et al. | 342/174 |
| 6,133,868 | A * | 10/2000 | Butler et al. | 342/174 |
| 6,252,542 | B1 | 6/2001 | Sikina et al. | |
| 7,482,976 | B2 * | 1/2009 | Plesinger | 342/372 |
| 2006/0118677 | A1 | 6/2006 | Goodzeit | |
| 2006/0240784 | A1 | 10/2006 | Naguib et al. | |
| 2007/0054699 | A1 | 3/2007 | Ding et al. | |
| 2007/0247363 | A1 * | 10/2007 | Piesinger | 342/368 |
| 2010/0178883 | A1 * | 7/2010 | Hardacker et al. | 455/101 |
| 2010/0188304 | A1 * | 7/2010 | Clymer et al. | 343/753 |

FOREIGN PATENT DOCUMENTS

| | | | |
|---|---|---|---|
| EP | 1 126 544 | | 4/2007 |
| JP | 2003218621 | A | 7/2003 |
| WO | WO-03021287 | A1 | 3/2003 |
| WO | WO-2005015771 | A1 | 2/2005 |

OTHER PUBLICATIONS

Lee, E.-A.; Dorny, C.N.; , "A broadcast reference technique for self-calibrating of large antenna phased arrays," Antennas and Propagation, IEEE Transactions on , vol. 37, No. 8, pp. 1003-1010, Aug. 1989.*

*Array Calibration Using Measured Data for Precise Angle-of-Arrival Estimation*, Panarat Cherntanomwong and Jun-ichi Takada Dept. of International Development Engineering, Sep. 2005 (http://ap.ide.titech.ac.jp/publications/Archive/WPMC2005Panarat.pdf).

*Smart Antenna Array Calibration Procedure Including Amplitude and Phase Mismatch and Mutual Coupling Effects*, Kapil R. Dandekar et al., 2000 (http://ieeexplore.ieee.org/xpl/freeabs_all.jsp?arnumber=905822).

*RF-Payload of TerraSAR-X*, Deitmar Pilz et al., 2005 (http://duepublico.uni-duisburg-essen.de/servlets/DerivateServlet/Derivate-14581/Paper/5_2.pdf).

International Search Report and Written Opinion, PCT/US2010/029464, dated Nov. 17, 2010.

* cited by examiner

*Primary Examiner* — John B Sotomayor

(74) *Attorney, Agent, or Firm* — Dickstein Shapiro LLP

(57) ABSTRACT

Antenna arrays are calibrated by providing one or more test signals from the antenna array to be calibrated to a receiving sensor while varying ambient operating conditions over some predetermined range of ambient operating conditions. The signal properties of these test signals may be measured by the receiving sensor or associated spectrum analyzer, and the ambient operating conditions under which the test signals are provided may be similarly measured. Thereafter, signal offsets for each of the antenna array's elements may be determined as a function of the measured ambient operating condition. Calibration information corresponding to these signal offsets may then be stored in a memory of the antenna array for use during operation of the antenna array. This calibration information may be in the form of a lookup table or a curve-fitting equation.

22 Claims, 4 Drawing Sheets

SYSTEMS AND METHODS FOR ANTENNA ARRAY CALIBRATION

FIELD OF THE INVENTION

The present invention relates in general to antenna arrays, and more particularly to performing antenna array calibration for a range of potential operating conditions.

BACKGROUND

A phased antenna array is a group of antennas in which the relative phases of the respective radio frequency (RF) signals feeding the antennas are varied in such a way that the effective radiation pattern of the array is reinforced in a desired direction and suppressed in undesired directions. One prominent use of such antenna arrays is to enable beamforming and beamsteering. Beamforming is the coherent summing of directionality such that signals are additive rather than random. When transmitting, a beamformer controls the phase and relative gain of the RF signal at each antenna element, based upon various algorithms, in order to create a coherent pattern in the wavefront. Beamsteering, on the other hand, refers to the concept of changing the direction of the main lobe of a radiation pattern by switching antenna elements or by changing the relative phases of the RF signals driving the elements.

With multiple antenna elements and related circuitry, calibration is an issue since it is difficult to achieve the same output power across each antenna in the array for a given gain setting. If the phase of the RF signal provided to the antenna elements is not properly calibrated to account for such phase offsets, the directional or omnidirectional beam patterns emanating from the antenna may be distorted and/or misdirected.

Antenna arrays can be implemented using individual antenna elements on an integrated circuit (IC), on a printed wiring board (PWB), or as separate components. In the case of an IC antenna array with IC-based amplifiers and related circuitry, matching can be approached by very precise attention to design and fabrication. While this may produce the desired results, it significantly increases manufacturing costs. In the case of a PWB implementation, controlled impedance and equal trace lengths can contribute to making each circuit perform identically. However, this can be time consuming, costly to implement and difficult to simulate. Calibration is further complicated when performed for antenna arrays which are expected to be placed in service under varying operating conditions.

As such, what is needed is a system and method for calibrating antenna arrays in order to overcome one or more of the aforementioned drawbacks.

BRIEF SUMMARY OF THE INVENTION

Disclosed and claimed herein are systems and methods for providing antenna array calibration. In one embodiment, a method providing a plurality of test signals from an antenna array to a receiving sensor while varying ambient operating conditions over a predetermined range of ambient operating conditions, where the antenna array includes a plurality of antenna elements. The method also includes measuring signal properties of the plurality of test signals and measuring a plurality of ambient operating conditions under which the plurality of test signals are provided. In addition, the method includes determining signal offsets for each of the plurality of antenna elements corresponding to each of the measured plurality of ambient operating conditions, and then storing calibration information in a memory of the antenna array corresponding to said determined signal offsets.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

Disclosure Overview

Figure 1A:
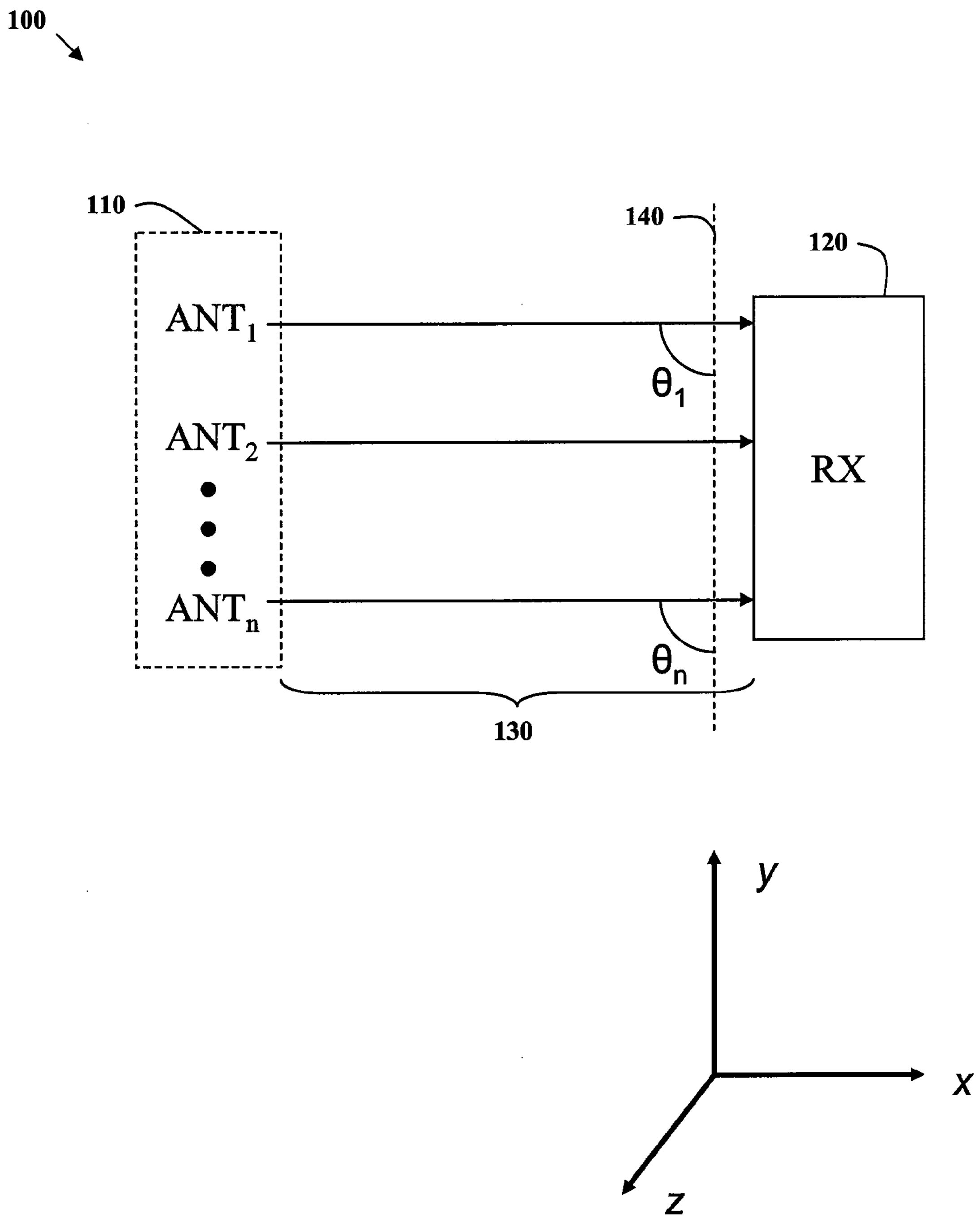
FIG. 1A depicts one embodiment of a calibration system configured in accordance with the principles of the invention.

One aspect of the present disclosure relates to providing a calibration process for antenna arrays such that the array will operate more efficiently in that transmission range will tend to increase for a given input power, and power consumption decrease for a fixed range application. In certain embodiments, one or more test signals may be provided from the antenna array to be calibrated to a receiving sensor while varying ambient operating conditions over some predetermined range of ambient operating conditions. The signal properties of these test signals may be measured by the receiving sensor or associated spectrum analyzer, and the ambient operating conditions under which the test signals are provided may be similarly measured. The RF signal properties to be measured may include measurement of the wavefront pattern, range and signal directionality produced by the antenna array.

Thereafter, signal offsets for each of the antenna array's elements may be determined as a function of the measured ambient operating condition. These signal offsets may be based on whether the actual produced signal wavefront is within a predetermined tolerance of a desired wavefront. In certain embodiments, this determination may comprise comparing the wavefront pattern, range and/or signal directionality of the received RF test signals to corresponding expected values.

Calibration information corresponding to these signal offsets may then be stored in a memory of the antenna array for use during operation of the antenna array. This calibration information may be in the form of a lookup table or a curve-fitting equation (or even a combination thereof).

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in or on a "computer storage medium," which may include any medium that can store or transfer information. Examples of the computer storage medium include an electronic circuit, a semiconductor memory device, a ROM, a flash memory or other nonvolatile memory, a floppy diskette, a CD-ROM, an optical disk, a hard disk, a fiber optic medium, a radio frequency (RF) link, etc.

Exemplary Embodiments

With reference to FIG. 1A, depicted is a calibration system 100 for performing the calibration operation according to one embodiment. As shown, an antenna array 110 is comprised of multiple antenna elements ($ANT_1$-$ANT_n$), each having its own antenna and related RF signal-transmission circuitry (not shown), as is generally known in the art. In the context of a calibration operation, the antenna array 110 may be configured to transmit one or more test signals to a receiver sensor 120, which itself may be comprised of an antenna and related RF signal-receiving circuitry (not shown), as is generally known in the art. In certain embodiments, the antenna array 110 may be placed some minimum distance 130 away from the receiver sensor 120 such that the center array element is essentially normal to the receiving plane 140 of the receiver sensor 120, and further that the antenna angles for the outlying antenna elements (i.e., $\theta_1$ and $\theta_n$) are sufficiently close to 90 degrees from the receiving plane to be considered normal (e.g., ±2 degrees).

By way of providing a non-limiting example, in the case of a millimeter wave IC antenna, the individual antenna elements may be approximately 1 or 2 mm apart in a grid of, for example, 52 antennas spanning an area of about 23 mm×23 mm. In that case, the minimum distance 130 may be about 1 meter, and still maintain the center array element in an essentially normal orientation to the receiving plane 140. Additionally, and as will be described in more detail below, the receiver sensor 120 may be used as a calibration sensor for each of the individual antenna elements $ANT_1$-$ANT_n$ as a first order approximation.

Each of the antenna elements ($ANT_1$-$ANT_n$) may be configured with its own RF signal processing control circuitry for providing appropriately-phased signals to each of the respective antenna elements ($ANT_1$-$ANT_n$) to form a desired directional or omnidirectional beam pattern.

The receiver sensor 120 may be implemented as a single receiver, as shown in FIG. 1, or alternatively may itself be comprised of an array of receiving sensors. The receiver sensor 120 may be operated as part of, or in connection with test equipment configured to carry out the calibration procedure described herein. Such test equipment may include, for example, the receiver sensor 120 and/or other signal receiving circuitry, one or more ambient condition sensors (not shown), a spectrum or signal analyzer, etc.

Additionally, the receiver sensor 120 may be configured to rotate at a fixed distance (yaw) so as to perform the calibration operation across an arc of the x-y plane. Similarly, tilting the sensor 120 at a fixed distance (pitch) may be done to perform the calibration across an arc along the z-axis. As will be described in more detail below, since the test signals provided by the antenna elements ($ANT_1$-$ANT_n$) to the receiver sensor 120 have known characteristics, any deviations or distortions therefrom that are detected by the receiver sensor 120 can, in turn, be used to determine offset values (e.g., phase and/or gain) on a per-element basis.

Figure 1B:
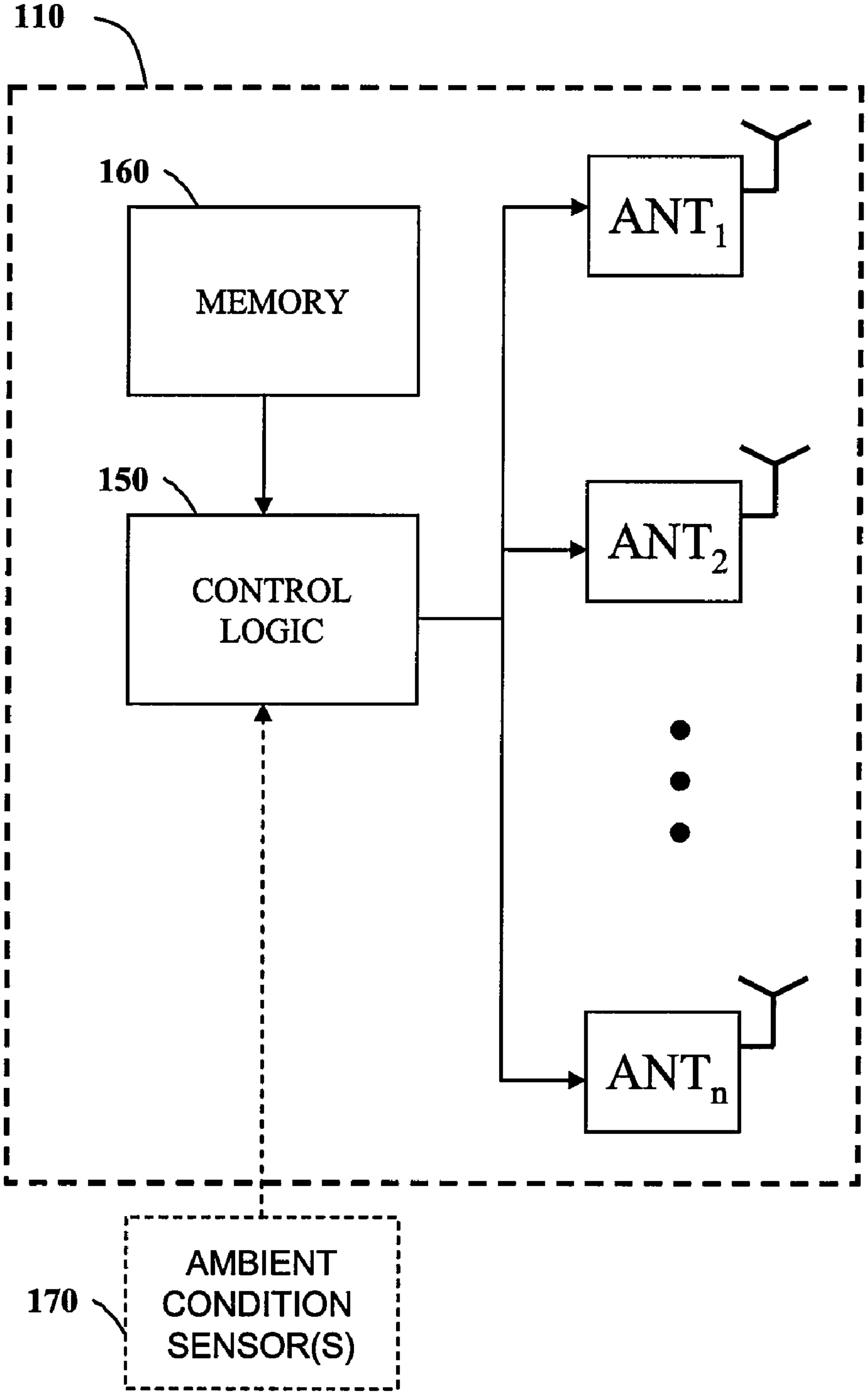
FIG. 1B depicts a block diagram of the antenna array of FIG. 1A, configured in accordance with one embodiment of the invention.

With reference now to FIG. 1B, depicted is a more detailed diagram of an exemplary embodiment of the antenna array 110 of FIG. 1A. In particular, antenna array 110 includes a plurality of individual antenna elements ($ANT_1$-$ANT_n$) and related RF signal-transmission circuitry, the details of which are generally known in the art. The antenna array 110 may be implemented as an IC, PWB or in separate components.

The antenna array 110 further includes control logic 150 for controlling/adjusting the RF signal characteristics (e.g., phase, gain, etc.) of each individual antenna elements ($ANT_1$-$ANT_n$). In certain embodiments, the control logic 150 may be configured to retrieve and execute instructions stored in the memory 160 for operating the antenna elements ($ANT_1$-$ANT_n$), in accordance with various beamforming and beamsteering algorithms to direct each of the antenna elements ($ANT_1$-$ANT_n$) to produce a desired wavefront pattern. Additionally, and as will be described in more detail below with reference to FIG. 2, the control logic 150 may be configured to adjust the RF signal characteristics (e.g., phase offsets, power gain, etc.) based on pre-stored offset values (e.g., determined during a calibration operation) that are specific to each of the individual antenna elements, as well as to the then-current ambient conditions. It should further be appreciated that the control logic 150 may be comprised of any number and type of processors, including but not limited to integrated circuit microprocessor(s), microcontroller(s), digital signal processor(s), etc. Similarly, memory 160 may include any combination of different memory storage devices, such as hard drives, random access memory (RAM), read only memory (ROM), FLASH memory, or any other type of volatile and/or nonvolatile memory.

Antenna array 110 may be optionally coupled to one or more ambient condition sensors 170, as depicted in FIG. 1B, for providing ambient condition information (e.g., temperature, humidity, etc.) to control logic 150. As will be described in more detail below with reference to FIG. 3, the ambient condition sensors 170 may be used to adjust for the actual ambient operating conditions, which can materially affect RF signal characteristics.

Figure 2:
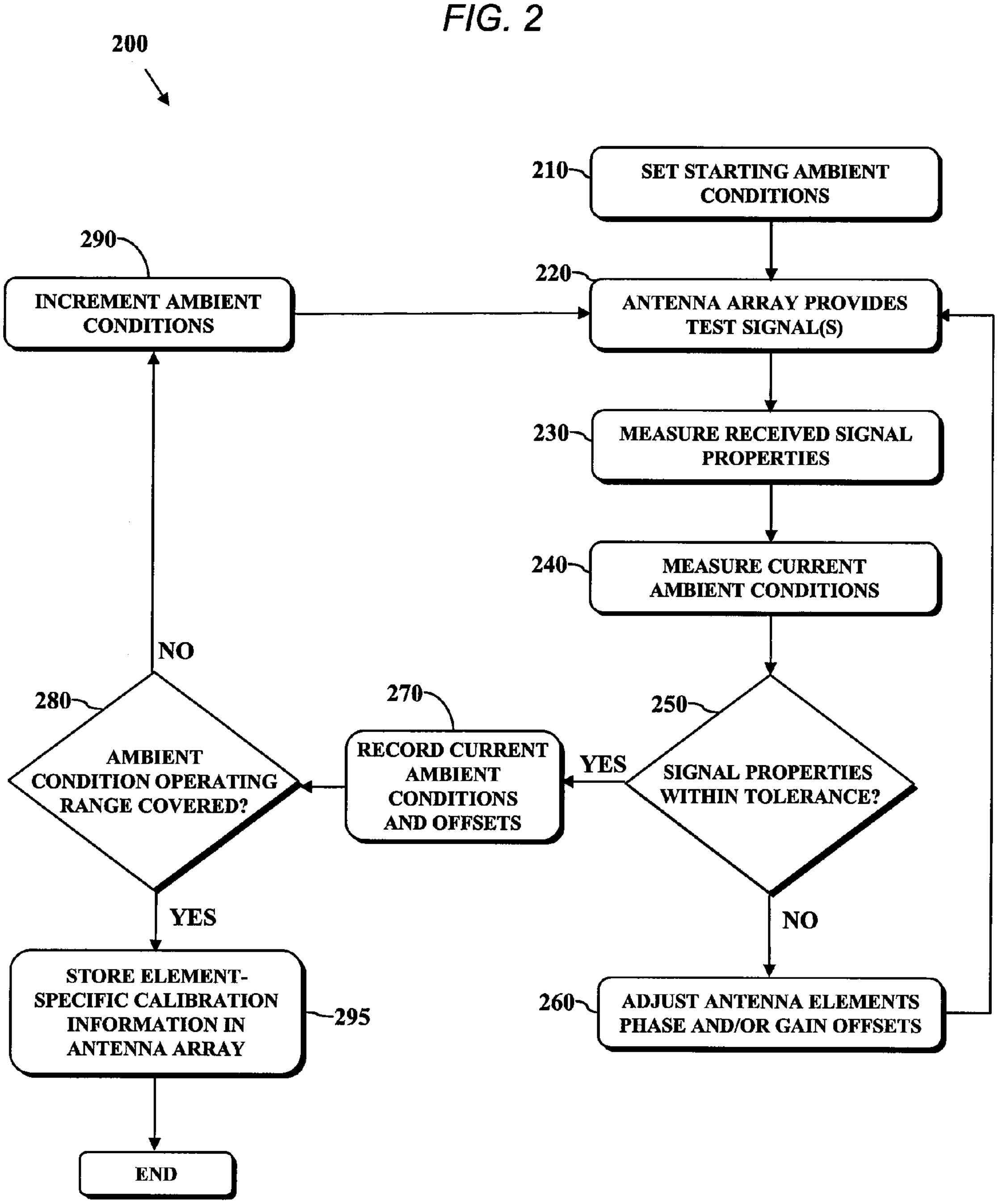
FIG. 2 is one embodiment of a process for implementing an antenna array calibration process in accordance with the principles of the invention.

Referring now to FIG. 2, depicted is one embodiment of a process for implementing an antenna array calibration scheme in accordance with the principles of the invention. In one embodiment, process 200 may be implemented as a factory-level calibration process, and may be performed by a calibration system (e.g., system 100) to calibrate an antenna array (e.g., antenna array 110). Alternatively, process 200 may be implemented at any point in time in which calibration may be desirable and/or beneficial. In certain embodiments, the calibration process 200 may be used to cause each antenna array to perform very similarly (e.g., within the manufacturer's tolerances) in a cost effective manner. Additionally, the calibration process of the current disclosure will tend to reduce design time, and hence reduce time to market. A properly aligned array will operate more efficiently in that transmission range will tend to increase for a given input power, and power consumption decrease for a fixed range application.

Process 200 begins at block 210 where the starting ambient operating conditions for the system under test (e.g., calibration system 100) may be set. In certain embodiments, this may comprise setting one or both of the temperature and humidity under which the system will operate. While this initial ambient operating condition may correspond to the average or expected operating condition for the antenna array under test, it may alternatively be associated with either end of a predetermined operating range (e.g., coldest expected operating temperature, highest expected operating temperature, lowest expected humidity, highest expected humidity, etc.).

Once the starting ambient condition is set, process 200 may continue to block 220 where each of the antenna elements (e.g., $ANT_1$-$ANT_n$) provides one or more test signals with known characteristics to a signal sensor (e.g., receiver sensor 120). It should further be appreciated that the test signals to be provided at block 220 may be provided over a range of sensor positions and orientations. For example, during transmission of the test signals, the receiving sensor may be rotated along the x-y plane (yaw) and/or tilted along the z-axis (pitch).

Once received by the receiving sensor, these test signals may then be measured at block 230, which may include any known equipment capable of receiving a test signal and measuring the RF signal properties and characteristics (e.g., spectrum analyzer, network analyzer, etc.). The RF signal properties to be measured may include measurement of the wavefront pattern, range and signal directionality produced by the antenna array.

Additionally, the then-current ambient conditions (e.g., temperature, humidity, etc.) may be measured as well (block 240). In the initial iteration of process 200, the values measured at block 240 should be consistent with the operating conditions set above at block 210. In certain embodiments, the ambient conditions may be measured by one or more sensors (e.g., ambient condition sensor(s) 170) coupled to the antenna array. Alternatively, the ambient condition sensor may be associated with the receiving sensor, or located in the general proximity to the overall calibration system. While ambient condition measurement operation of block 240 is shown as being performed after the signal measurement operation of block 230, it should be appreciated that these order of these operations may be reversed or even performed simultaneously.

Process 200 may then continue to block 250 where a determination may be made as to whether the actual produced signal wavefront is within a predetermined tolerance of a desired wavefront, where the predetermined tolerance may be set by the manufacturer. In certain embodiments, this determination may comprise comparing the wavefront pattern, range and/or signal directionality of the received RF test signals to corresponding expected values.

If it is determined at block 250 that the test signal properties are not within tolerance (e.g., desired signal wavefront achieved), then process 200 may continue to block 260 where one or both of the individual antenna elements' phases and gains may be adjusted by a predetermined increment (e.g., ±1 degree, ±1 dB, etc.). Process 200 may then return to block 220 where a new set of test signals may be provided by the antenna array using the newly-incremented signal offsets. The operations described above with reference to blocks 220-250 are then repeated.

If, on the other hand, it is determined at block 250 that the test signal properties are within tolerance (e.g., desired signal wavefront achieved), then process 200 may continue to block 270 where the current ambient conditions measured at block 240 and the current signal offsets (as previously adjusted at block 260) for each of the antenna elements that make up the array under test may be recorded for later use.

Thereafter, a determination may be made at block 280 as to whether phase and/or gain offsets have been recorded for the antenna array over an entire predetermined ambient operating condition range. If not, process 200 may continue to block 290 where the current ambient operating conditions may be incremented by a predetermined incremental value (e.g., ±predetermined number of degrees, ±predetermined percentage of humidity, etc.). Thereafter, process 200 may return to block 220 where a new set of test signals may be provided by the antenna array for subsequent measurement and analysis, as described above with reference to blocks 220-250, in an iterative fashion.

If on the other hand, offset values have been collected for the antenna array over the entire predetermined ambient operating condition range, then process 200 may continue to block 295 where a memory of the antenna array (e.g., memory 160) may be programmed with element-specific calibration information for the antenna array under test. This calibration information may be in the form of a lookup table or a curve-fitting equation (or even a combination thereof). In the case of lookup table, the ambient operating condition values (from block 240) and corresponding signal offsets (from block 260) recorded at block 270 for each of the antenna elements may be stored/tabulated in a lookup table. This lookup table may then be accessed, during normal operation to optimize the array's performance, as will be described in more detail below with reference to FIG. 3. While it should be appreciated that such a lookup table may take many different forms, in one embodiment it may include a tabulation of signal offset values (e.g., phase and/or gain) for each of the individual antenna elements as a function of ambient conditions.

In the case of a curve-fitting equation, the ambient operating condition values and corresponding signal offsets from block 270 may be used to generate a curve-fitting equation using known regression analysis, interpolation and/or extrapolation techniques. Once an applicable equation is known, it may be stored in the antenna array's memory for use during normal operation, as will be described below with reference to FIG. 3. The choice as to whether a lookup table or curve-fitting equation is used may be based on the device's available memory and processing power. That is, while the lookup table may require more memory, it will require a relatively low amount of processing power. Conversely, use of a curve-fitting equation may require less memory, but more processing power.

In this above-described manner, the calibration process 200 of FIG. 2 provides a cost efficient approach to ensuring that a manufacturer's antenna arrays perform very similarly (e.g., within the manufacturer's tolerances) while in use. Moreover, a properly-aligned array will operate more efficiently in that transmission range will tend to increase for a given input power, and power consumption decrease for a fixed range application.

Figure 3:
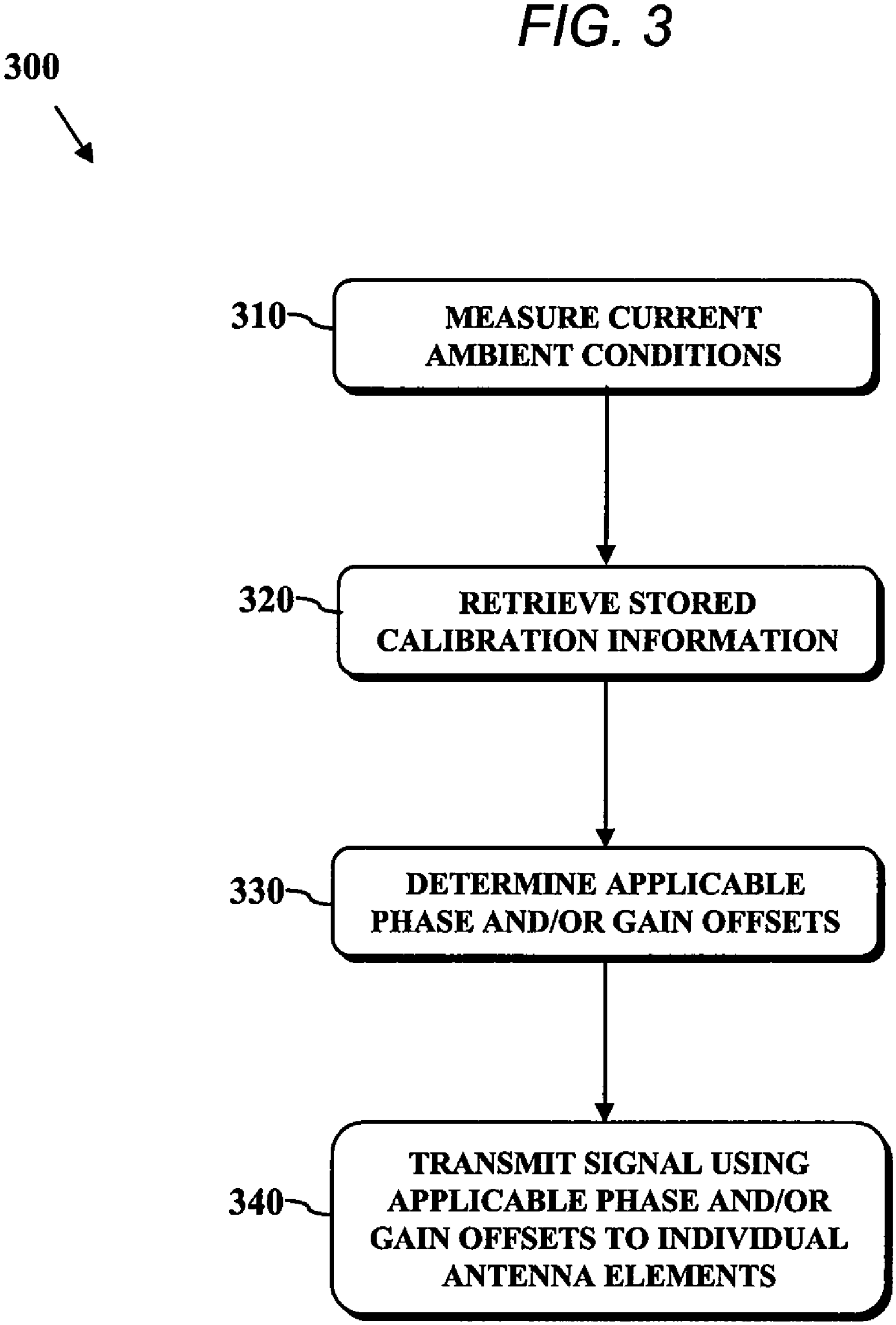
FIG. 3 is one embodiment of a process for how the calibration information of FIG. 2 may be utilized.

Referring now to FIG. 3, depicted is a process for transmitting RF signals from an antenna array (e.g., antenna array 110) that has been calibrated in accordance with the principles of the invention (e.g., according to process 200). Process 300 may be implemented in normal operation in an uncontrolled environment, such as would be the case at a user location. Process 300 may performed once, such as upon initialization of the antenna array, or on a continuous or periodic basis during operation of the antenna array.

Process 300 begins at block 310 where the ambient conditions (e.g., temperature, humidity, etc.) may be measured using one or more sensors (e.g., ambient condition sensor(s) 170) coupled to the antenna array. Using these ambient condition values at block 320, calibration information may be retrieved from a memory (e.g., memory 160) of the antenna array corresponding to the individual antenna elements (e.g., $ANT_1$-$ANT_n$). As previously described, this calibration information may be in the form of tabulated values in a lookup table, or alternatively may be comprised of a curve-fitting equation. In either case, the array's processing logic (e.g., control logic 150) may be configured to perform the necessary lookup operation (when using a lookup table) or the mathematical computation (when using an equation) to determine the applicable signal (e.g., phase and/or gain) offsets for each of the individual array elements (block 330).

Thereafter, the array's processing logic may further be configured to apply the corresponding signal offsets to the signal processing logic of each of the array's elements in order to produce an optimal and coherent array wavefront (block 340). Since the signal offsets that are utilized are both element-specific as well as ambient condition specific, manufacturing imperfections and operating condition variations may be corrected for in a cost-effective manner.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for providing antenna array calibration, the method comprising the acts of:

providing a plurality of test signals from an antenna array to a receiving sensor while varying ambient operating conditions over a predetermined range of ambient operating conditions, wherein the antenna array includes a plurality of antenna elements;

measuring signal properties of the plurality of test signals provided by the antenna array to the receiving sensor;

measuring a plurality of ambient operating conditions under which the plurality of test signals are provided;

determining signal offsets for each of the plurality of antenna elements corresponding to each of the measured plurality of ambient operating conditions; and storing calibration information in a memory of the antenna array corresponding to said determined signal offsets.

2. The method of claim 1, wherein determining the signal offsets comprises:

comparing each of the measured signal properties of the plurality of test signals to one or more predetermined tolerances; and adjusting at least one of a signal phase and a signal gain of any of the plurality of test signals that exceed the one or more predetermined tolerances.

3. The method of claim 2, wherein adjusting at least one of the signal phase and signal gain comprises adjusting at least one of the signal phase and signal gain by a predetermined increment.

4. The method of claim 3, wherein providing the plurality of test signals comprises providing at least one of the plurality of test signals after said adjusting.

5. The method of claim 1, wherein said ambient operating conditions comprise at least one of temperature and humidity.

6. The method of claim 1, wherein storing calibration information comprises storing a lookup table in the memory of the antenna array, wherein the lookup table is comprised the determined signal offsets for each of the plurality of antenna elements as a function of the plurality of ambient operating conditions.

7. The method of claim 1, wherein storing calibration information comprises storing a curve-fitting equation representing the mathematical relationship between the determined signal offsets and the plurality of ambient operating conditions.

8. The method of claim 1, further comprising:

receiving a user request to transmit a desired signal using the antenna array;

measuring current ambient operating conditions;

accessing the calibration information from memory;

determining applicable signal offsets for the plurality of antenna elements using the calibration information corresponding to the current ambient conditions; and transmitting the desired signal using the applicable signal offsets.

9. A system for providing antenna array calibration comprising:

a receiver sensor;

an antenna array comprising a plurality of antenna elements, a memory and a control circuit electrically coupled to each of the plurality of antenna elements and to the memory, wherein the control circuit is configured to transmit a plurality of test signals to the receiving sensor over a predetermined range of ambient operating conditions;

means for measuring signal properties of the plurality of test signals provided by the antenna array to the receiving sensor;

means for measuring a plurality of ambient operating conditions under which the plurality of test signals are provided; and means for determining signal offsets for each of the plurality of antenna elements corresponding to each of the measured plurality of ambient operating conditions, wherein calibration information is stored in the memory of the antenna array corresponding to said determined signal offsets.

10. The system of claim 9, wherein the means for determining the signal offsets comprises:

means for comparing each of the measured signal properties of the plurality of test signals to one or more predetermined tolerances; and means for adjusting at least one of a signal phase and a signal gain of any of the plurality of test signals that exceed the one or more predetermined tolerances.

11. The system of claim 10, wherein the means for adjusting at least one of the signal phase and signal gain comprises means for adjusting at least one of the signal phase and signal gain by a predetermined increment.

12. The system of claim 11, wherein the control circuit is further configured to provide at least one of the plurality of test signals after said means for adjusting adjusts at least one of the signal phase and signal gain of at least one of the plurality of test signals.

13. The system of claim 9, wherein said ambient operating conditions comprise at least one of temperature and humidity.

14. The system of claim 9, wherein the calibration information comprises a lookup table in the memory of the antenna array, wherein the lookup table is comprised the determined signal offsets for each of the plurality of antenna elements as a function of the plurality of ambient operating conditions.

15. The system of claim 9, wherein the calibration information comprises a curve-fitting equation representing the mathematical relationship between the determined signal offsets and the plurality of ambient operating conditions.

16. The system of claim 9, wherein the control circuit is further configured to:

receive a user request to transmit a desired signal using the antenna array;

measure current ambient operating conditions;

access the calibration information from memory;

determine applicable signal offsets for the plurality of antenna elements using the calibration information corresponding to the current ambient conditions; and transmit the desired signal using the applicable signal offsets.

17. A method for providing antenna array calibration, the method comprising the acts of:

(a) transmitting a test signal from an antenna array to a receiving sensor, wherein the antenna array includes a plurality of antenna elements;

(b) measuring signal properties of the test signal provided by the antenna array to the receiving sensor;

(c) measuring a current ambient operating condition under which the test signal was provided;

(d) determining if the measured signal properties exceed one or more predetermined tolerances;

(e) adjusting at least one of a signal phase and a signal gain of at least one of the plurality of antenna elements by a signal offset value when the measured signal properties exceed the one or more predetermined tolerances;

(f) repeating (a)-(e) until said measured signal properties do not exceed the one or more predetermined tolerances; and (g) storing calibration information in a memory of the antenna array corresponding to said current ambient operating condition and a total amount of said signal offset values.

18. The method of claim 17, further comprising:

(h) incrementing the current ambient operating condition; and (i) repeating (a)-(h) over a predetermined range of ambient operating conditions.

19. The method of claim 18, wherein (e) adjusting at least one of the signal phase and signal gain comprises (e) adjusting at least one of the signal phase and signal gain by a predetermined increment.

20. The method of claim 17, wherein said ambient operating conditions comprise at least one of temperature and humidity.

21. The method of claim 17, wherein (g) storing calibration information comprises (g) storing a lookup table in the memory of the antenna array, wherein the lookup table is comprised of signal offsets for each of the plurality of antenna elements as a function of the corresponding current ambient operating conditions, wherein the signal offsets correspond to the total amount of said signal offset values.

22. The method of claim 17, wherein (g) storing calibration information comprises (g) storing a curve-fitting equation representing the mathematical relationship between signal offsets, which correspond to the total amount of said signal offset values, and the corresponding current ambient operating conditions.

* * * * *